(12) United States Patent
Borst et al.

(10) Patent No.: US 8,239,259 B2
(45) Date of Patent: Aug. 7, 2012

(54) DONATIONS IN A VIRTUAL ENVIRONMENT

(75) Inventors: Karl Joseph Borst, Toronto (CA); Sally Christensen, Richmond Hill (CA)

(73) Assignee: Ganz, Woodbridge, Ontario ( * ) Notice: Subject to any disclaimer, the term of this patent is extended or adjusted under 35 U.S.C. 154(b) by 849 days.

(21) Appl. No.: 12/192,569

(22) Filed: Aug. 15, 2008

(65) Prior Publication Data

US 2010/0042486 A1    Feb. 18, 2010

(51) Int. Cl.
*G06Q 30/00*    (2012.01)

(52) U.S. Cl. ........ 705/14.12; 705/1; 705/14.17; 705/43; 705/44

(58) Field of Classification Search ............... 705/14.12, 705/1, 14.17, 43, 44
See application file for complete search history.

(56) References Cited

U.S. PATENT DOCUMENTS

| | | | |
|---|---|---|---|
| 5,826,250 A * | 10/1998 | Trefler ............................ 706/50 |
| 5,895,902 A * | 4/1999 | Ziarno ............................ 235/380 |
| 6,119,229 A | 9/2000 | Marinez et al. | |
| 6,175,857 B1 * | 1/2001 | Hachiya et al. ............... 709/206 |
| 6,227,966 B1 | 5/2001 | Yokoi | |
| 6,273,815 B1 * | 8/2001 | Stuckman et al. ................ 463/9 |
| 6,311,195 B1 | 10/2001 | Hachiya | |
| 6,343,990 B1 | 2/2002 | Rasmussen et al. | |
| 6,406,370 B1 | 6/2002 | Kumagai | |
| 6,468,155 B1 | 10/2002 | Zucker | |
| 6,476,830 B1 | 11/2002 | Farmer et al. | |
| 6,595,858 B1 | 7/2003 | Tajiri et al. | |
| 6,609,968 B1 | 8/2003 | Okada | |
| 6,612,501 B1 | 9/2003 | Woll et al. | |
| 6,663,105 B1 | 12/2003 | Sullivan et al. | |
| 6,704,784 B2 | 3/2004 | Matsuda | |
| 6,722,973 B2 | 4/2004 | Akaishi | |
| 6,722,989 B1 * | 4/2004 | Hayashi .......................... 463/43 |
| 6,729,884 B1 * | 5/2004 | Kelton et al. ................. 434/236 |
| 6,735,324 B1 | 5/2004 | McKinley et al. | |
| 6,758,746 B1 | 7/2004 | Hunter | |
| 6,773,325 B1 | 8/2004 | Mawle et al. | |
| 6,773,344 B1 * | 8/2004 | Gabai et al. ....................... 463/1 |
| 6,890,179 B2 | 5/2005 | Rogan | |
| 6,910,186 B2 | 6/2005 | Kim | |
| 6,918,833 B2 | 7/2005 | Emmerson | |
| 6,954,728 B1 | 10/2005 | Kusumoto et al. | |
| 7,054,831 B2 | 5/2006 | Koenig | |
| 7,089,083 B2 | 8/2006 | Yokoo et al. | |
| 7,113,913 B1 * | 9/2006 | Davis et al. ....................... 705/4 |
| 7,171,154 B2 | 1/2007 | Fujisawa | |
| 7,179,171 B2 | 2/2007 | Forlines | |
| 7,191,220 B2 * | 3/2007 | Ohwa ............................. 709/206 |
| 7,465,212 B2 * | 12/2008 | Ganz ............................... 446/175 |

(Continued)

OTHER PUBLICATIONS http://web.archive.org/web/20041210035624/http://distributedcomputing.info/ap-charity.html; Wayback Machine Internet archive from original website Dec. 10, 2004; User donates to charity, but is only allowed to click once (donate once) per day.*

(Continued)

*Primary Examiner* — John Weiss
*Assistant Examiner* — Adam Chornesky
(74) *Attorney, Agent, or Firm* — Pearne & Gordon LLP

(57) ABSTRACT

A donation aspect for a website is provided. Amounts of donations are limited and users are given awards based on their donations.

25 Claims, 6 Drawing Sheets

U.S. PATENT DOCUMENTS

| | | | |
|---|---|---|---|
| 7,534,157 B2 * | 5/2009 | Ganz | 446/175 |
| 7,742,943 B2 * | 6/2010 | Postrel | 705/14.3 |
| 7,765,124 B2 * | 7/2010 | Postrel | 705/14.3 |
| 7,769,630 B2 * | 8/2010 | Postrel | 705/14.28 |
| 7,778,907 B1 * | 8/2010 | Haskins et al. | 705/36 R |
| 7,862,428 B2 * | 1/2011 | Borge | 463/29 |
| 2002/0029179 A1 * | 3/2002 | Gruber et al. | 705/35 |
| 2002/0160835 A1 | 10/2002 | Fujioka et al. | |
| 2002/0169668 A1 | 11/2002 | Bank | |
| 2003/0093293 A1 * | 5/2003 | Han | 705/1 |
| 2004/0043806 A1 | 3/2004 | Kirby et al. | |
| 2004/0053690 A1 | 3/2004 | Fogel et al. | |
| 2004/0093266 A1 * | 5/2004 | Dohring | 705/14 |
| 2004/0143852 A1 | 7/2004 | Meyers | |
| 2004/0193489 A1 | 9/2004 | Boyd | |
| 2004/0219961 A1 | 11/2004 | Ellenby | |
| 2004/0225518 A1 * | 11/2004 | Bain | 705/1 |
| 2004/0242326 A1 | 12/2004 | Fujisawa et al. | |
| 2004/0249735 A1 * | 12/2004 | Cassani et al. | 705/35 |
| 2005/0021399 A1 * | 1/2005 | Postrel | 705/14 |
| 2005/0021401 A1 * | 1/2005 | Postrel | 705/14 |
| 2005/0027626 A1 * | 2/2005 | Garcia | 705/35 |
| 2005/0051617 A1 * | 3/2005 | Gorelick | 235/379 |
| 2005/0059483 A1 | 3/2005 | Borge | |
| 2005/0149394 A1 * | 7/2005 | Postrel | 705/14 |
| 2005/0177428 A1 * | 8/2005 | Ganz | 705/14 |
| 2005/0182693 A1 | 8/2005 | Alivandi | |
| 2005/0192864 A1 | 9/2005 | Ganz | |
| 2005/0215306 A1 * | 9/2005 | O'Donnell et al. | 463/17 |
| 2005/0250415 A1 | 11/2005 | Barthold | |
| 2005/0250416 A1 | 11/2005 | Barthold | |
| 2006/0100018 A1 | 5/2006 | Ganz | |
| 2007/0060368 A1 | 3/2007 | Cheng | |
| 2007/0073582 A1 | 3/2007 | Jung et al. | |
| 2007/0088656 A1 | 4/2007 | Jung et al. | |
| 2007/0112624 A1 | 5/2007 | Jung et al. | |
| 2007/0130001 A1 | 6/2007 | Jung et al. | |
| 2008/0070690 A1 | 3/2008 | Van Luchene et al. | |
| 2008/0163055 A1 | 7/2008 | Ganz et al. | |
| 2009/0248544 A1 * | 10/2009 | Ganz | 705/27 |
| 2010/0042486 A1 * | 2/2010 | Borst et al. | 705/14.12 |

OTHER PUBLICATIONS

DialogSTICSrch20Mar2012; search for online games having players donate to a pool that can be tapped by other players.*
Grace, "Web Site Tycoon's Next Goal: Sixth Grade"; Woonsocket Call, Jun. 19, 2002.
http://web.archive.org.web.20031202190119/www.monopets.com/, Dec. 2, 2003.
Lehdonvirta, Vili. "Virtual Economics: Applying Economics to the Study of Game Worlds" Proceedings of Future Play, Michigan State University, Oct. 13-15, 2005.
Klotz, Hattie, "Look Out, Pokemon; Neopets are Taking Over", The Ottawa Citizen, p. A.1.FRO, Feb. 7, 2000.
http://www.shiningstars.com/site.php, Jun. 25, 2008.
http://www.shiningstars.com/parents.php, Jul. 4, 2007, Archive Version found on www.archive.org—"Wayback Machine."
http://www.neopets.com/takedonation_new.phtml?donation, Aug. 12, 2008.
http://www.neopets.com/soupkitchen.phtml, Jun. 20, 2008.
"The Sims Booklet," dated 2000.

* cited by examiner

DONATIONS IN A VIRTUAL ENVIRONMENT

BACKGROUND

Our co-pending application Ser. No. 11/027,647, filed Dec. 30, 2004, and incorporated in its entirety herein by reference, discusses a system of interacting with a virtual representation of a real world product. According to this system, a user can buy a toy such as 100 which is associated with a special code 105. The toy 100 exists in the real world, and the code forms a key to the virtual world 110. The user enters the code 105 on a website and enters the virtual world 110.

The virtual world 110 provides activities and views with which the user can interact. The virtual world 110, as part of the interaction, provides a virtual replica 115 of the actual toy 100. Users can carry out various activities on the website using their virtual replica 115 of the toy 100. For example, the user can form a house with rooms, furniture, things, clothing, and other things. The user can also carry out activities to earn virtual cash, and purchase virtual items using that virtual cash.

Certain websites that operate with virtual cash of this type have allowed donations to others. This has taken the form of a virtual donation area that allows accepting donations from users, and giving them to others.

SUMMARY

The present application describes aspects of allowing donations on a website.

One aspect is a donation station. This allows more "affluent" users to donate items to other less-affluent users. The application describes improvements in the system and process.

DETAILED DESCRIPTION

The present application describes additional aspects, actions and activities and additional structure, for adding to a website of the type described in our co-pending application Ser. No. 11/027647. This allows using virtual cash and/or other rewards that have been obtained on a website by interacting with activities and virtual pets, in order to make a donation to another "more needy" user. The user donates some of their own possessions.

The inventors recognized that previous donation techniques in websites that allowed donations had certain drawbacks that reduced their usability. The inventors recognized that these websites allowed accepting any donation of any type. It was noticed that many users simply used their donations as ways to "discard" items that they did not want.

Figure 1:
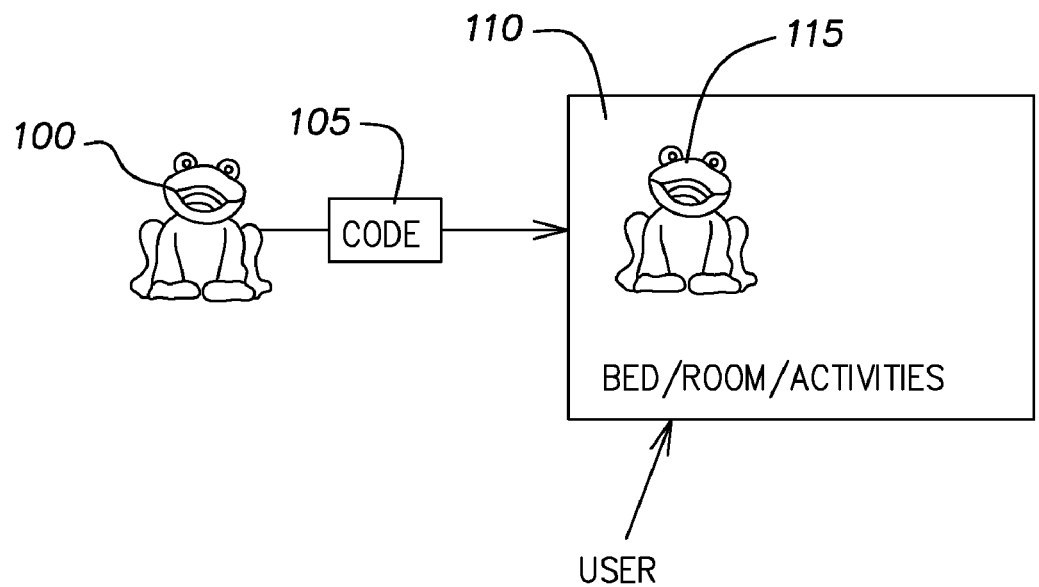
FIG. 1 shows a basic system.
Figure 2:
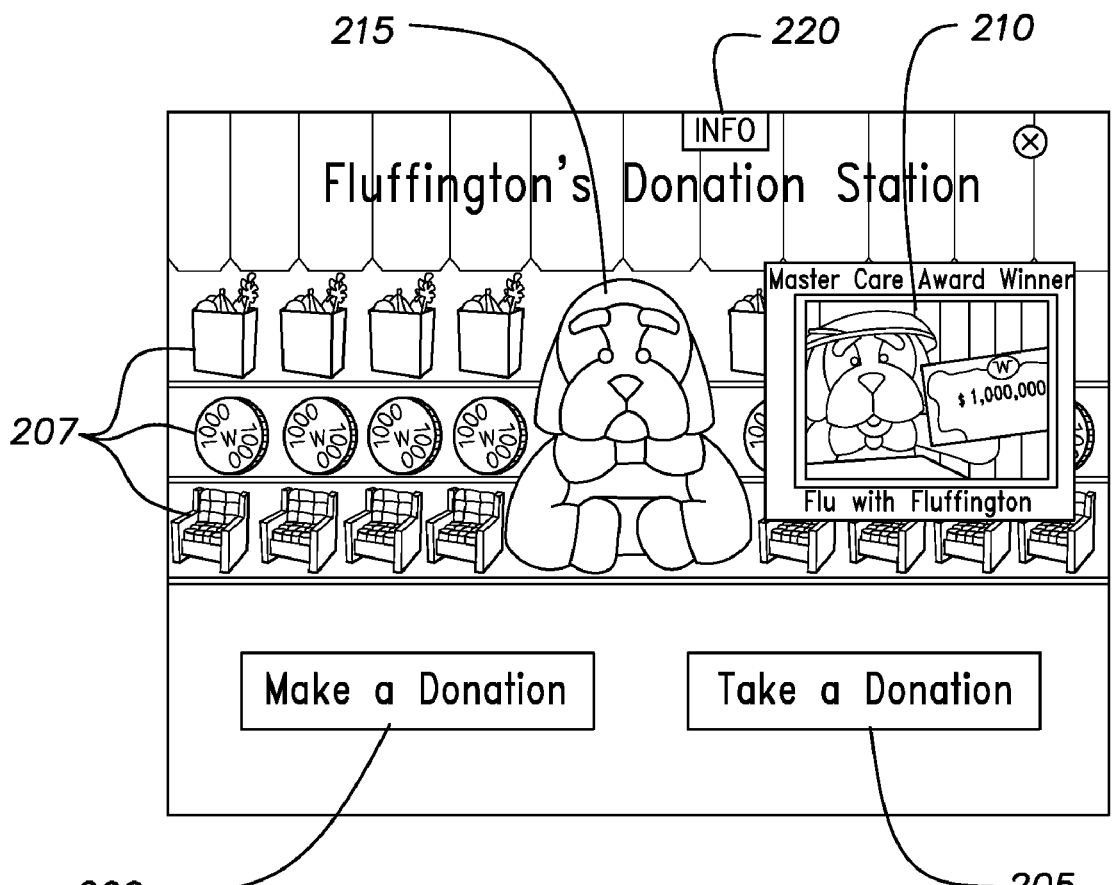
FIG. 2 shows a main page for the donation station.

FIG. 2 illustrates an embodiment, including the initial access to the ability to donate, referred to herein as the "donation station". The user gets initial access to a front page which allows a number of options. The user can press or select the "make a donation" button 200 to make a donation. The user can also receive a donation by selecting the "take a donation" button 205. There are also a number of items 207 shown in the donation station, and an award winner window 210. For example, one or more award winners from previous periods can be shown in the award window 210. These "donation awards" can be additional incentives to convince a user to make a donation.

One aspect of this system is that the user is only allowed to make a certain number of donations in a unit time. For example, users may only be allowed to make one donation per day.

Another aspect relates to the way in which users operate on such a website. Users who go to this kind of website arrive with little virtual cash. It takes some time to receive the cash. Until they receive the cash, they may need a "handout". This system may limit the number of donations a user can receive, so that the user may get donations when they first register, but later get fewer donations or none at all. When a specified donation level is reached, where that can be a number of donations that have been received or a time over which the donations have been received, the user may be thereafter prevented from receiving further donations.

Figure 3A:
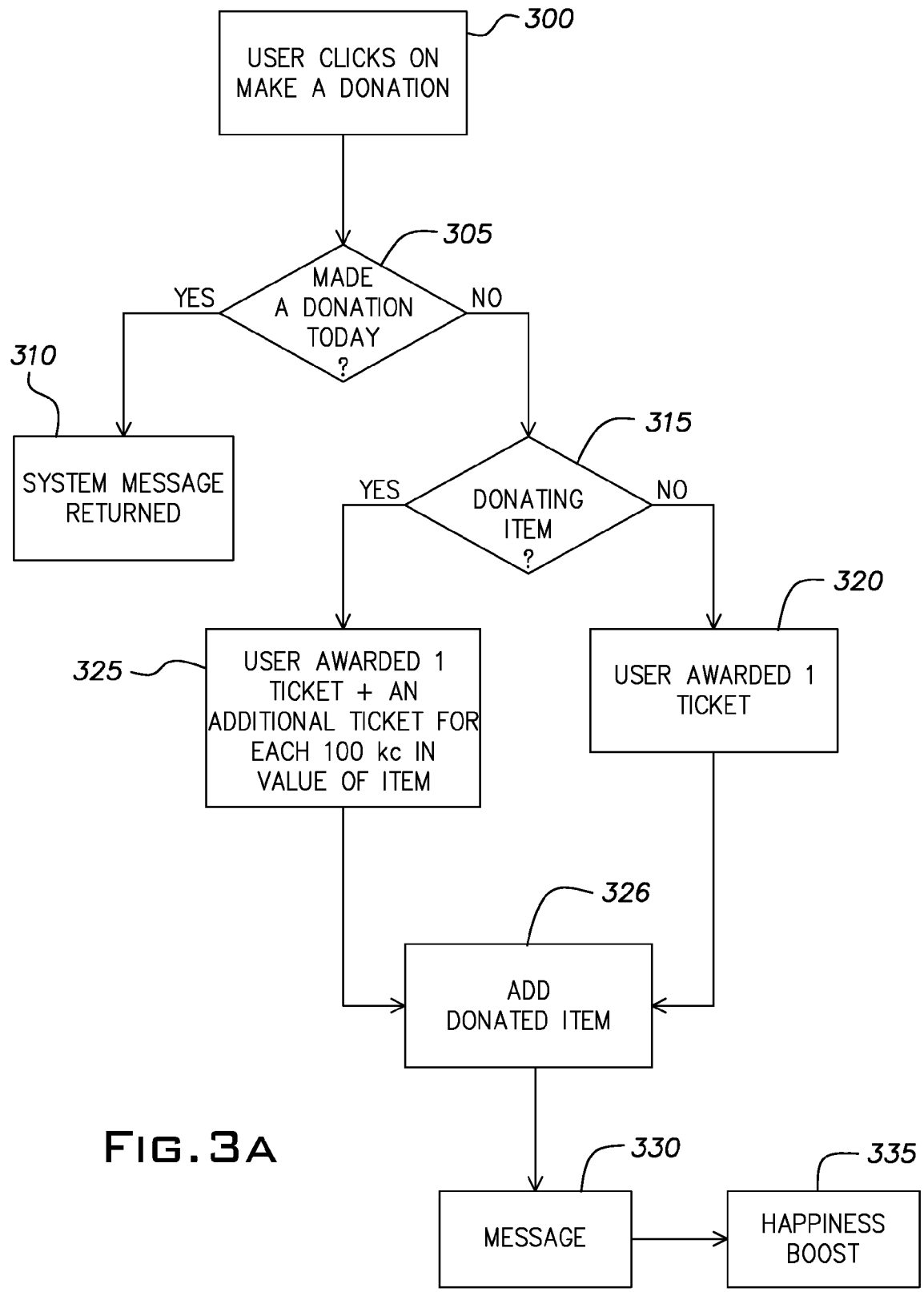
FIGS. 3A and 3B be show flowcharts of operation of this system.
Figure 3B:
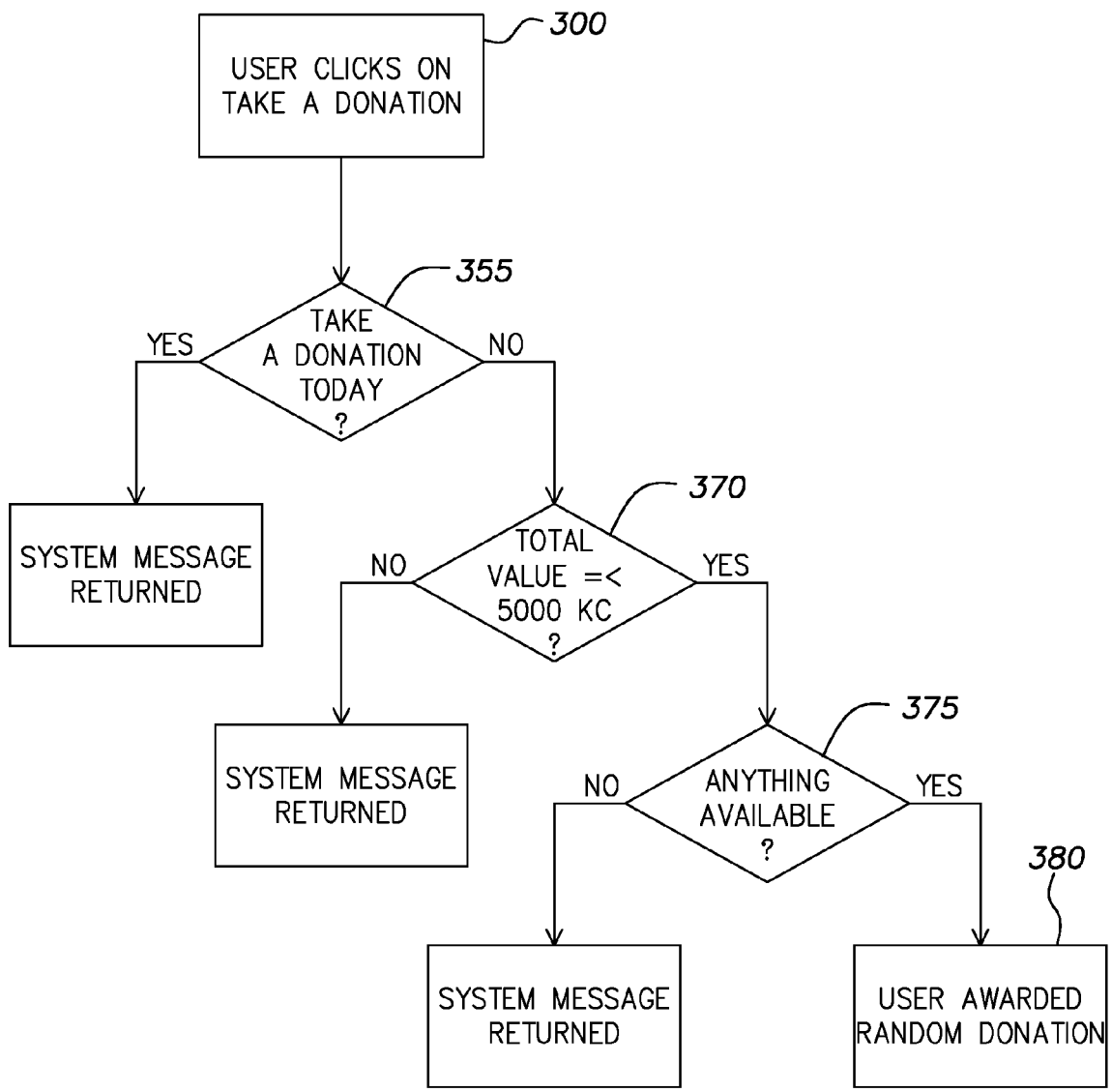

The computer system may operate according to the flowchart of FIGS. 3A-3B. When the user selects "make a donation" using button 200, step 300 in FIG. 3A is executed. The first test at 305 is whether a donation has already been made today. If so, the user receives a system message at 310 such as "sorry, you can only make one donation a day". Permitting only a single donation in a day encourages the users to return to the website daily, so that they can donate each day (and improve their donation score, see below). When the users return each day, this provides a more robust website where more users are returning more often.

If the user has not made a donation that day at 305, the user is questioned about the kind of donation that they want to make at 315.

Figure 4:
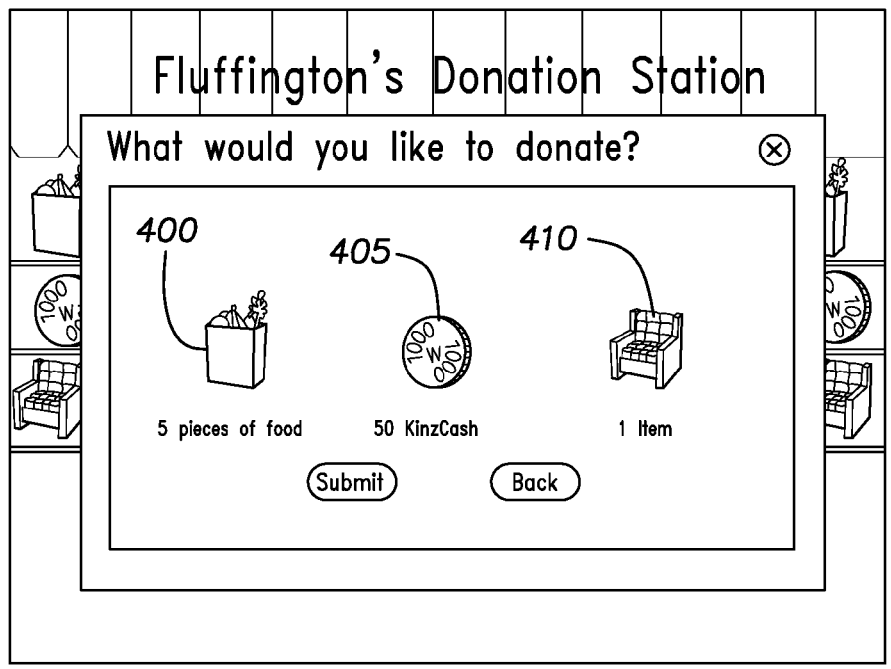
FIG. 4 shows donation availability of various items.

For example, this may show the screen in FIG. 4 which questions what the user wants to donate. FIG. 4 illustrates how the user can donate food 400, virtual cash 405, or specific items at 410. The user receives "tickets" based on what they have donated. A user can donate virtual cash, virtual food, or virtual non-food items. The items that can be donated are limited, so that users are prevented from donating only items that they find undesirable.

For example, a user that donates virtual cash or food may receive one ticket for that donation at 320. A user that donates an item may receive one ticket plus an additional ticket for each 100 virtual cash of the value of the item at 325.

The numbers of tickets are added to the user's account at 320 or 325, and the donated item is added to the inventory of the donation station at 326. After adding the donated item, the system sends a message to the user at 330 which indicates a number of tickets which have been added, and the total number of tickets. The system maintains a variable associated with each user that indicates the user's total number of tickets. Thus, the message, for example, which can indicate the number of tickets won (as described herein) today, as well as the total from the week, and the total in general.

In addition to the tickets, according to the Webkinz® system, the virtual pets are maintained with health, happiness and hunger variables that indicate the well-being of all users' virtual pets. When the user makes a donation, the pet belonging to the active user receives a happiness boost at 335. For example, the happiness boost may increase the pet's happiness value by +2. The pet's state may also change, for example, to excited when this happens.

The user can also select taking a donation in FIG. 2 by executing the button 205. This causes execution of step 350 and the flowchart of FIG. 3B. Only one donation a day can be taken in this embodiment, so step 355 detects whether a donation has already been made in that same day. If so, the user receives the same message at 360, followed by exiting the routine. If the user has not taken a donation, their eligibility for donations is assessed at 370, as discussed herein. The user is presented with certain options for receiving as a donation, for example three items may be presented to the user from which they can choose one item to accept. These items are reserved for that user so that another user cannot take any of the items before the user has a chance to choose which item to accept, preventing the user from "scrambling" to receive donations.

In addition, limits are made on the total number of donations that can be received over the lifetime of the user's account, e.g., 30, 60 or 90 donations total, so that, for example, the user is limited to receiving donations only when first getting acquainted with the website. An alternative embodiment may limit the user to only receiving donations within a certain time period, e.g. 30, 60 or 90 days after first registration.

The donation station also includes, as described above, the previous week's winner of certain awards. This box 210 shows the truncated username, as well as the pet name and an image of the pet that was active at the time the award was won. The Webkinz® system may allow the user to own and take care of multiple pets, and therefore the active pet can be rewarded in this way.

According to an embodiment, a user coming to the donation station is met and greeted by a virtual representation; here shown as Fluffington 215. Fluffington 215 may say the following script:

"Welcome to my Donation Station! Do you have more virtual cash than you know what to do with? Want to be as generous as I am? Show how much you care for your fellow Webkinz® world members by donating once a day.

Just click on the make a donation button. If you're lucky, you'll get the awesome Master Care Award. But remember, donating is its own reward!

Is your pet hungry and your virtual cash a little low? If you need a little help, you can also take a donation. Just click on the take a donation button. Donations are meant for the Webkinz World® members that need them the most."

There may also be an information button 220 that can be executed to bring up an information item, which for example contains the following message:

"Information:

How many donations can I make a day?

You can only make one donation a day. Each donation gives you one ticket for the Master Care Award. If you donate an item, you will also get one ticket for every 100 virtual cash in value of the object. So, if you donate something that you can sell for 200 virtual cash, you will get 1 ticket for donating, plus another 2 for the value of the item.

How many donations can I take a day?

Any Webkinz World® member that is needy enough can take one donation a day.

How do I know if my Webkinz® pet is needy enough?

The Donation Station is meant for Webkinz World® members that are just starting out, or just need a bit of help. The total value of your house is used to decide whether your Webkinz® pet is needy enough—the easiest way to find out if you are needy enough is to try to take a donation!

What do I get for donating?

Donating makes your pet happy! You will also be entered into a draw for the Master Care Award—a trophy that shows just how much you care! For each donation, you will receive 1 ticket for the Master Care Award. If you donate an item, you will also receive 1 ticket for every 100 virtual cash in value of the object. So, if you donate something that you can sell for 200 virtual cash, you will get 1 ticket for donating, plus another 2 for the value of the item.

How does the Master Care Award work?

At the end of each week, all of the tickets from all of the donations will be put in a box and one winner will be announced. If you've won, you will receive a KinzPost™ message and a prize in your dock."

Figure 5:
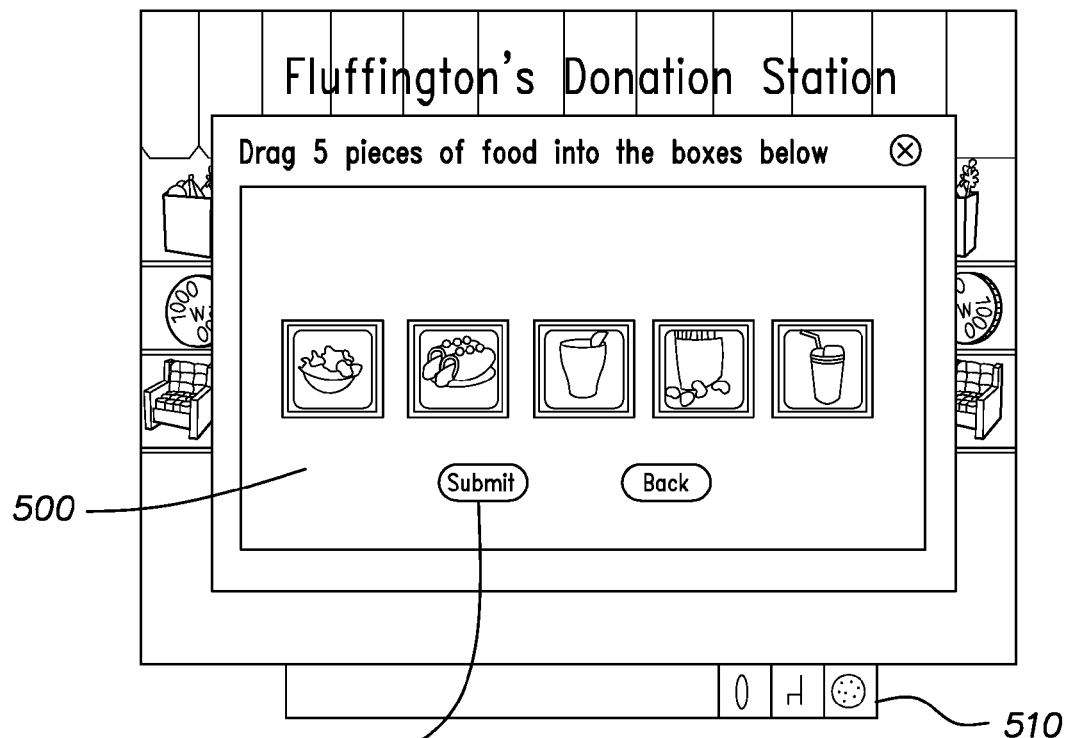
FIG. 5 illustrates how food items can be dragged from a user's dock into the donation box.

In FIG. 4, when the user selects the food button, they are brought to the screen FIG. 5. FIG. 5 shows the user's "dock" 510, which illustrates all of the user's items that they have won and are being stored on their behalf. The user can be presented with an interface in FIG. 5 that allows dragging items from their dock 510 which shows all of their stored information, into the donation box 500. The user can drag for example five items of food into this donation box from the dock where they otherwise store food that they can use to be their virtual pet. According to one embodiment, the user must donate five items of food. The submit button 502 is hidden until five items of food have been dragged from their dock 510 into the donation box 500, and then they can press the submit button 502 in order to continue.

The system automatically determines if the user has dragged in a food item. A nonfood item is automatically returned to the dock, and the submit button is not available until all five slots are filled.

Five food items are stored as a single grocery bag item added to the recipient's stock when accepting a donation. Certain undesirable items, such as "gunk" are not permitted to be donated. Once submitted, the user receives a ticket towards the Master Care award. Other items may be prevented from being donated such as purchased virtual items, or rare prize items, to prevent them from being donated by error or through improper use. By preventing certain items from being donated, a higher level of interaction is required by only allowing only certain items to become "tradable" items.

Figure 6:
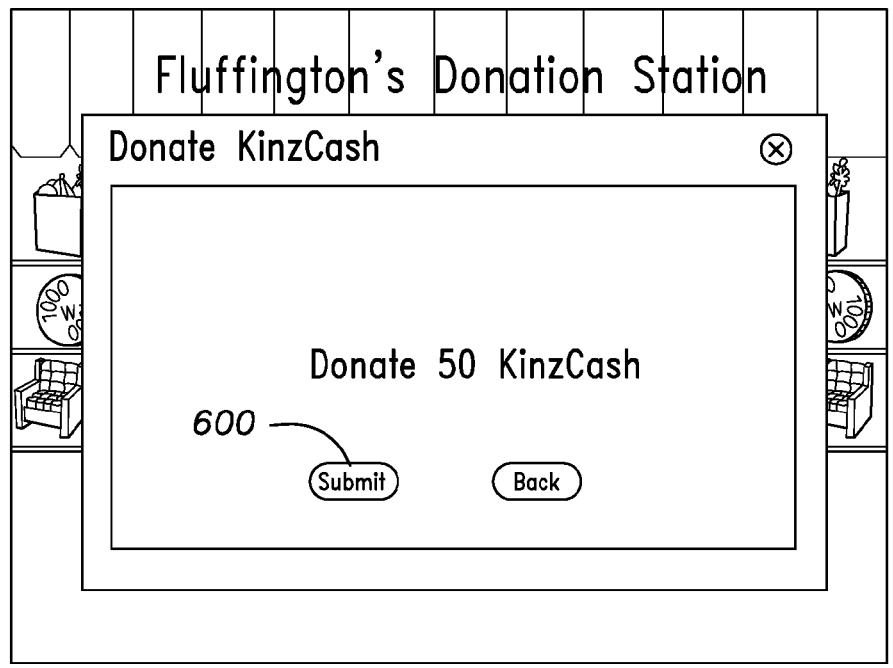
FIG. 6 illustrates donation of virtual cash.

In a similar way, when the user indicates that they are going to submit virtual cash, they are presented with the interface of FIG. 6. This is simply a confirmation prompt, in which they confirm their desire to donate the virtual cash. The user can execute the submit button 600 in order to donate a specified amount of virtual cash. The submit button will not show up or will be grayed out if the user does not have a sufficient amount of virtual cash to proceed. Once submitted, the user is given a ticket towards the Master Care award drawing.

Figure 7:
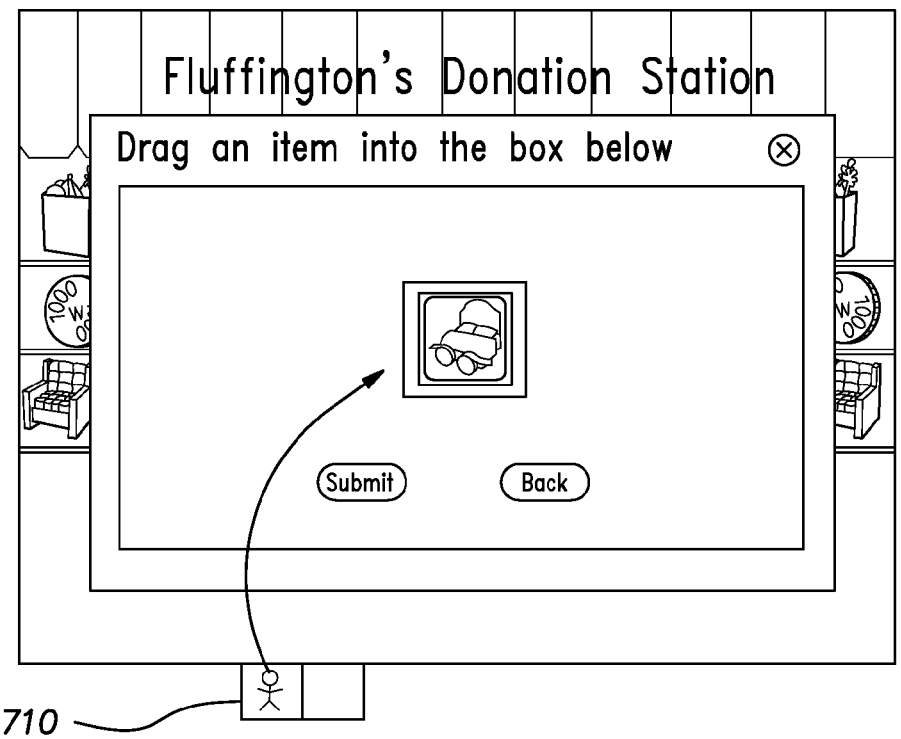
FIG. 7 illustrates donation of an item.

Donating other items uses the user interface shown in FIG. 7. A user can drag an item from their dock 710, which stores their selection of items, into the donation box. FIG. 7 only allows donation of nonfood items. Any attempted donation of food items are automatically returned to the dock.

At 320/325, the user earns one ticket for donating. The user earns one other additional ticket for every 100 virtual cash units of items that have been donated.

In addition to donation being its own reward, the users receive the tickets as described and certain users may qualify to get a Master Care award which appears in their dock. This may be awarded at random, or may be given to the user who donates the most items.

Figure 8:
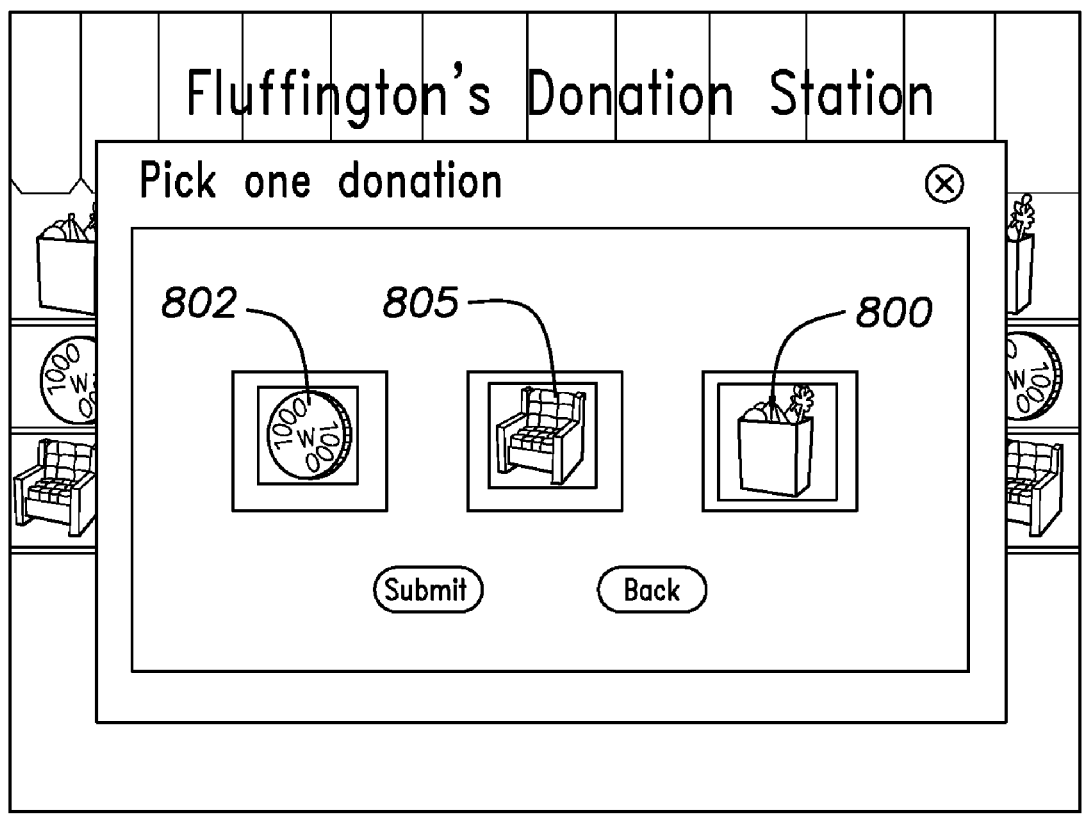
FIG. 8 illustrates an interface for receiving a donation.

The taking of donations may use the screen shown in FIG. 8 to receive a donation according to the techniques in the flowchart of FIG. 3B. For example, the user can pick one donation to receive. Once receiving that donation, the user can choose a grocery bag 800, if they are low on food for their pet, or they may receive virtual cash (icon 802) or item(s) (icons 805).

The system may automatically determine whether the user has an account value low enough to receive the donation items. The total value of the account may be calculated to include the sum of all items in a users account, for example the sum of all virtual cash associated with the user's account and the virtual cash-equivalent values of all virtual items associated with the user's account. For example, the user may not be allowed to receive a donation item unless they have a total value in their account less than 5000 units at 370. Once that is determined, the system determines if donations are available at 375. If so, the user is presented with the options in FIG. 8 and allowed to select donations to receive. The system may automatically choose dummy donations to be given and received in the event that the system does not have real donations to give and/or receive. The user may be awarded a random donation at 380.

Upon receiving a donation, the user receives the following message, for example:

"Look what you got! Thanks to the generosity of our Webkinz World® members, you have received [donation] from Fluffington's Donation Station!, where [donation]=5 pieces of food, 1 item or 50 virtual cash."

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of donations can be taken.

Also, the inventors intend that only those claims, if any, which use the words "means for" are intended to be interpreted under 35 USC 112, sixth paragraph. The computers which are used to host the website and/or to access the website may be any kind of computer, either general purpose, or some specific purpose computer such as a workstation. For example, the computer may be an Intel (e.g., Pentium or Core 2 duo) or AMD based computer, running Windows XP or Linux, or may be a Macintosh computer. The computer may also be, for example, a handheld or other mobile computer, such as a PDA, cellphone, or laptop or a special purpose computer such as a game console.

The programs may be written in any suitable programming language, such as C, Python, Java, Brew or other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased, while still staying within the teachings of the present application, unless some different range is specifically claimed. Where a specified logical sense is used, the opposite logical sense is also intended to be encompassed.

What is claimed is:

1. A method, comprising:
   first using a computer for allowing multiple users to interact with a website that allows each of said multiple users to earn rewards from interacting with the website, to save said rewards in an account, and to use said rewards on the website;
   second allowing a first user of said multiple users to donate some of said rewards that have been saved, as a donation to another user of said multiple users on the website, where said donation does not specify a specific identity of said another user; and
   third allowing the another user to receive said rewards that have been donated, wherein said website checks an account of said another user and only allows said another user to receive said donation if said account associated with said another user has less than a specified amount of existing rewards therein and has received donations of less than a specified donation level.

2. A method as in claim 1, wherein said second allowing comprises allowing the first user to donate only once per day.

3. A method as in claim 1, further comprising providing a donation award to said first user based on an amount of said rewards that said first user donates.

4. A method as in claim 1, further comprising providing a donation award to said first user for donating, wherein said donation award is a different kind of award than said rewards, and said donation award includes a numerical value depending on a type of the donation and how many times the donation has been made.

5. A method as in claim 1, wherein said website allows interacting with virtual pets, and said rewards allow purchasing items for said virtual pets.

6. A method as in claim 5, wherein said virtual pets are rated according to health, happiness, and hunger, and wherein said allowing said first user to donate carries out a boost of at least one of said health, happiness and hunger for one or more of said virtual pets that is associated with said first user.

7. A method as in claim 1, wherein said account shows items in a dock, the dock being associated with a view seen by said first user, and wherein said second allowing comprises allowing the first user to drag any of said items from the dock into a donation area on a viewable screen that is associated with providing donations.

8. A method as in claim 7, wherein said donation area only allows a certain kind of donations, and only items that are of a certain type can be dragged into said donation area.

9. A method as in claim 8, further comprising automatically returning items back to the dock which are not of the certain type.

10. A method as in claim 1, wherein said second allowing comprises requiring a minimum donation prior to said second allowing.

11. A method as in claim 1, wherein said specified donation level is an amount of donations that have been received.

12. A method as in claim 1, wherein said specified donation level is a time over which donations have been received.

13. A method, comprising:
    from a server computer system that operates a website, first allowing multiple users to interact with said website, where said website allows each of said multiple users to earn rewards from interacting with the website, to save said rewards in an account that is viewable on the website, and to use said rewards on the website by obtaining items on the website, and removing items from the account when they are used on the website;

second allowing, from said server computer system, a first user of said multiple users to donate one or more of said items from said account as a donation to a another user of said multiple users on the website, where said donation does not specify a specific identity of said another user, and wherein said second allowing comprises allowing the user to donate only a specified number of times each day; and third providing said first user who has donated with a score or an award associated with said donation, said score or award being stored on said server computer system and indicated on said website, and said score or award including a rating for a number of times that donations have been made.

14. A method as in claim 13, further comprising allowing said another user to receive said one or more of said items that have been donated, where said website checks said account of said another user and only allows said another user to receive said donation if said account associated with said another user has less than a specified amount of rewards therein and has received donations less than a specified donation level.

15. A method as in claim 13, wherein said second allowing comprises allowing the first user to donate only once per day.

16. A method as in claim 15, wherein said score includes a numerical value depending on a type of the donation, the score being different for a first type of donation than for a second type of donation.

17. A method as in claim 13, wherein said website allows interacting with virtual pets, and said rewards allow purchasing items for said virtual pets.

18. A method as in claim 17, wherein said virtual pets are rated according to health, happiness, and hunger, and wherein said allowing said first user to donate carries out a boost of at least one of said health, happiness and hunger for one or more of said virtual pets that is associated with said first user.

19. A method as in claim 13, wherein said account shows items in a dock, the dock being associated with a view seen by a user, and wherein said second allowing comprises allowing the first user to drag any of said items from the dock into a donation area.

20. A method as in claim 19, wherein said donation area only allows a certain kind of donations, and only items that are of a certain type can be dragged into said donation area.

21. A method as in claim 20, further comprising automatically returning items back to the dock which are not of the certain type.

22. A method, comprising:
from a server computer system that operates a website, first allowing multiple users to interact with said website by allowing said multiple users to own and interact with virtual toys on the website, that allows each of said multiple users to earn rewards from interacting with the web site, to save said rewards in an account that is viewable on the website, and to use said rewards on the website by obtaining items on the website and using those items in combination with their virtual toys, and removing items from the account when they are used on the website;

producing outputs from said server computer system for displaying a user interface screen to a first user of said multiple users that allows said first user to donate some of said rewards that have been saved, as a donation to a another user of said multiple users on the website, where said first user does not specify a specific identity of said another user;

first limiting said first user to donating only once per predetermined period of time;

said server computer system second limiting said first user to donating only certain items from a user's personal account as said donation;

providing said first user who has donated with a score associated with said donation; and providing an award to said first user on said website, based on said score.

23. A method as in claim 22, further comprising allowing said another user on the website to receive said rewards that have been donated, wherein said website checks said account of said another user and only allows said another user to receive said donation if said account associated with the another user has less than a specified amount of existing rewards therein and has received donations fewer than a fixed threshold of donations.

24. A method comprising:
first using a computer for allowing multiple users to interact with a website that allows each of said multiple users to earn rewards from interacting with the website, to save said rewards in an account, and to use said rewards on the website;

second allowing a first user of said multiple users to donate some of said rewards that have been saved, as a donation to another user of said multiple users on the website; and third allowing the another user to receive said rewards that have been donated, wherein said website checks an account of said another user and only allows said another user to receive said donation if said account associated with said another user has less than a specified amount of existing rewards therein and has received donations of less than a specified donation level, wherein said second allowing the first user to donate the rewards comprises offering the first user access to a donation station on the website where said donation is to be deposited from the first user's account and made available to be withdrawn by the multiple users on the website after being removed from the account of the first user.

25. A method as in claim 24, wherein said third allowing comprises making the donation station accessible to the multiple users on the website, allowing the multiple users on the website to submit a request to take the rewards donated by the first user from the donation station.

* * * * *